(12) United States Patent
Recker

(10) Patent No.: US 6,864,662 B2
(45) Date of Patent: Mar. 8, 2005

(54) ELECTRIC POWER ASSIST STEERING SYSTEM AND METHOD OF OPERATION

(75) Inventor: Darrel Alan Recker, Ypsilanti, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 11 days.

(21) Appl. No.: 10/426,306

(22) Filed: Apr. 30, 2003

(65) Prior Publication Data

US 2004/0217729 A1 Nov. 4, 2004

(51) Int. Cl.$^7$ .............................. H02P 5/28; H02P 7/00; B62D 5/04
(52) U.S. Cl. ..................... 318/807; 318/799; 318/432; 318/434; 180/443; 180/446; 701/41; 701/42
(58) Field of Search ................................ 318/807, 799, 318/432, 434, 433; 180/443, 446; 701/41, 42

(56) References Cited

U.S. PATENT DOCUMENTS

| | | | |
|---|---|---|---|
| 4,757,869 A | 7/1988 | Morishita et al. | |
| 5,475,289 A | 12/1995 | McLaughlin et al. | |
| 5,517,415 A | 5/1996 | Miller et al. | |
| 5,568,389 A | 10/1996 | McLaughlin et al. | |
| 5,623,409 A | 4/1997 | Miller | |
| 5,668,721 A | 9/1997 | Chandy | |
| 5,881,836 A | 3/1999 | Nishimoto et al. | |
| 5,919,241 A | 7/1999 | Bolourchi et al. | |
| 5,920,161 A | 7/1999 | Obara et al. | |
| 6,008,614 A | 12/1999 | Imai | |
| 6,104,159 A | 8/2000 | Seok | |
| 6,129,172 A | 10/2000 | Yoshida et al. | |
| 6,304,052 B1 | 10/2001 | O'Meara et al. | |
| 6,329,781 B1 | 12/2001 | Matsui et al. | |
| 6,373,211 B1 | 4/2002 | Henry et al. | |
| 6,407,531 B1 * | 6/2002 | Walters et al. | 318/805 |
| 6,427,104 B1 | 7/2002 | Matsushita et al. | |
| 6,498,449 B1 | 12/2002 | Chen et al. | |
| 6,504,336 B2 * | 1/2003 | Sakamaki | 318/727 |
| 6,687,590 B2 * | 2/2004 | Kifuku et al. | 701/43 |
| 6,703,756 B2 * | 3/2004 | Reutlinger | 310/254 |
| 6,741,060 B2 * | 5/2004 | Krefta et al. | 318/727 |
| 2002/0125064 A1 | 9/2002 | Mori et al. | |
| 2004/0135538 A1 * | 7/2004 | Gallegos-Lopez et al. | 318/807 |

* cited by examiner

Primary Examiner—David Martin
Assistant Examiner—Patrick Miller
(74) Attorney, Agent, or Firm—Brinks Hofer Gilson & Lione

(57) ABSTRACT

An electric power steering assist system for an automotive vehicle comprises a brushless electric motor and a control module for regulating the motor based upon space vector modulation. In response to a steering command, the control module determines a desired quadrature axis current component to provide torque assist in turning the wheels. Also, the control module determines a desired direct axis current component based upon the motor speed such that the desired direct axis current component is zero when the motor speed is less than or equal to the maximum design motor speed, and is negative when the motor speed exceeds the maximum design motor speed. By utilizing a negative direct axis current component, the control module implements a field weakening effect within the motor that allows the motor speed to be temporarily increased greater than the maximum design motor speed to react to rapid steer commands by the operator, such as encountered in evasive maneuvers and the like.

11 Claims, 4 Drawing Sheets

ELECTRIC POWER ASSIST STEERING SYSTEM AND METHOD OF OPERATION

TECHNICAL FIELD OF THE INVENTION

This invention relates to an electric power assist steering system for an automotive vehicle that includes a brushless electric motor. More particularly, this invention relates to such system wherein operation of the brushless motor is controlled by space vector modulation, and wherein the operating conditions include a negative direct axis current component, Id, to achieve a field weakening effect in the motor to enhance performance during evasive maneuvers and the like.

BACKGROUND OF THE INVENTION

In an automotive vehicle, a steering wheel is mechanically coupled to the wheels of the vehicle through a rack-and-pinion mechanism. An operator turns the steering wheel to rotate a steering column and thereby turn the vehicle wheels. Electric power steering assist systems, referred to as EPAS systems, have been developed that include an electric motor coupled to the steering mechanism to assist the operator in turning the wheels. A torque sensor detects torque in the steering column resulting from a turning command by the operator. The electric motor is actuated in response to the detected steering torque and reduces the steering force required by the operator to turn the vehicle wheels.

It is preferred to use a brushless motor in an EPAS system to optimize efficiency and reduce response time. The brushless motor comprises a stator that includes multiple electrical coils. Electric current conducted through the coils generates an electromagnetic field. A rotor having permanent magnets is positioned within the electromagnetic field. By regulating the voltage across the coils, the electric current is varied to rotate the electromagnetic field and thereby cause the rotor to rotate. The current within the electric motor is characterized by space vectors that feature a direct axis current component, referred to as Id, and a quadrature axis current component, referred to as Iq. In general, the control module for the EPAS system determines an Iq to provide a torque assist to the operator and calculates the voltages to the coils to achieve the desired Iq. Motor torque efficiency is optimized when the Id is zero, so the control module calculations are based upon 0 Id.

The speed of the motor is determined by the mechanical coupling between the steering wheel and the steering mechanism. That is, the electric motor does not turn the vehicle wheels faster or slower than the steering command from the operator. The control module regulates the rotation of the electromagnetic field, and thus the rotor, to match the steering command. The design parameters of the motor determine a maximum design motor speed. Under certain conditions, the operator may seek to rotate the steering wheel faster than the maximum design speed. Such conditions may arise, for example, when making evasive maneuvers. Under such conditions, the motor does not provide the desired assist and may even act as a drag hindering the rapid turning of the wheels, resulting in a noticeable increase in steering force required by the operator.

Therefore, there is a need for an improved EPAS system wherein a brushless electric motor is controlled by space vector modulation and wherein the system is capable of responding to a rapid steering command by the operator by temporarily increasing the motor speed above the maximum design speed for the motor.

BRIEF SUMMARY OF THE INVENTION

This invention provides an electric power steering assist system for an automotive vehicle that includes vehicle wheels and a steering column rotatable by an operator for inputting a steering command to turn the vehicle wheels, and a method for operating such system. The system includes a brushless electric motor comprising a stator for generating an electromagnetic field, and a rotor within the electromagnetic field at a motor speed and provides assist in turning the vehicle wheels in response to the steering command. A control module determines electrical current to the stator based upon space vector modulation. For this purpose, the control module determines a desired quadrature axis current component, Iq and a desired direct axis current component, Id. In accordance with this invention, the desired Id is 0 when the motor speed is less than or equal to the maximum design motor speed and negative when the motor speed exceeds the maximum design motor speed. By modulating the current to achieve a negative Id when the motor speed exceeds the maximum design motor speed, the control module implements a field weakening effect within the brushless motor that allows the motor speed to be temporarily increased greater than the maximum design motor speed. Thus, the electric power steering assist system of this invention is able to react to a rapid steer command by the operator, such as is encountered in evasive maneuvers and the like.

BRIEF DESCRIPTION OF THE DRAWINGS

This invention will be further described with reference to the following drawings wherein.

DETAILED DESCRIPTION OF THE INVENTION

Figure 1:
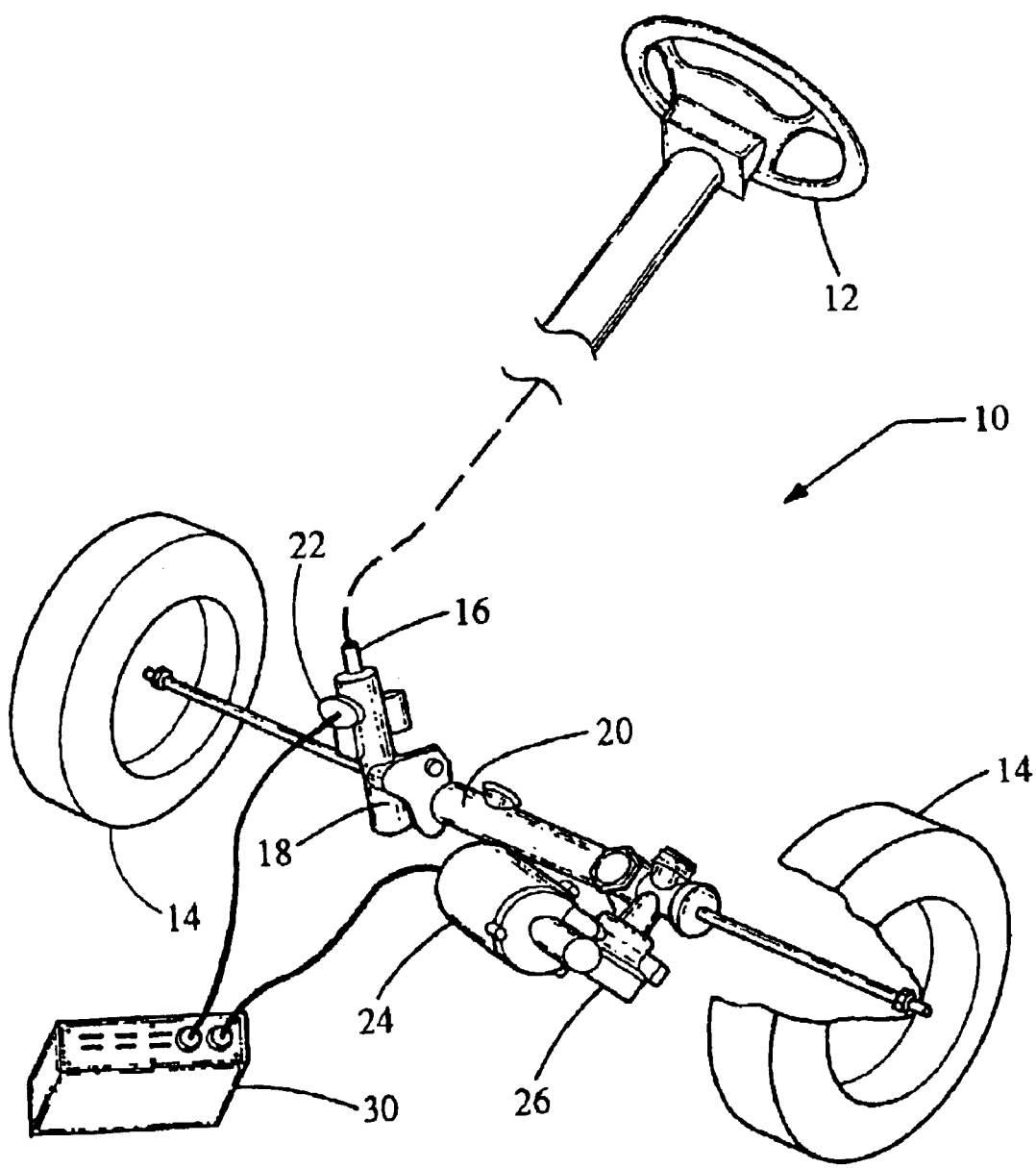
FIG. 1 is a view showing elements of an electric power assist steering system in accordance with a preferred embodiment of this invention.

In accordance with the preferred embodiment of this invention referring to FIG. 1, an electric power assist steering system 10, referred to as EPAS system, comprises a steering wheel 12 mechanically coupled to vehicles wheels 14 by rack-and-pinion mechanism. An operator rotates steering wheel 12 to input a steering command, which in turn rotates a steering column 16 that is connected to a pinion gear 18. Pinion gear 18 laterally displaces a rack 20 that turns vehicle wheels 14 to change the direction of the vehicle. EPAS system 10 comprises a torque sensor 22 for detecting torque applied to steering column 16 when rotated by a steering command. An electric motor 24 is coupled to rack 20 through a gear box 26 and is actuated in response to torque detected by sensor 22 to laterally displace rack 20 consistent with the steering command and thereby reduce the steering force required by the operator in turning steering wheel 12 to turn vehicle wheels 14.

EPAS system 10 further comprises a space vector modulation control module 30 that receives an input from torque sensor 22, calculates motor parameters using space vector modulation, and outputs a signal to actuate motor 24 to provide a desired level of steering assist. It is a feature of EPAS system 10 that motor 24 is mechanically coupled to rack 20 through gear box 26, and that steering wheel 12 is also mechanically coupled to rack 20 through pinion gear 18. In determining the operating parameters for motor 24, the motor speed is set consistent with the lateral displacement of rack 20 by the operator in rotating pinion 18. Moreover, motor 24 is selected to operate efficiently at a maximum design motor speed, which translates to a maximum lateral speed of rack 20. In the event that the steering command from the operator through pinion gear 18 calls for a rack displacement greater than the maximum design motor speed of motor 24, this invention provides a temporary increase in the motor speed above the maximum design motor speed. In this manner, EPAS system 10 is able to respond effectively to rapid steering commands such as encountered in evasive maneuvers and the like.

Figure 2:
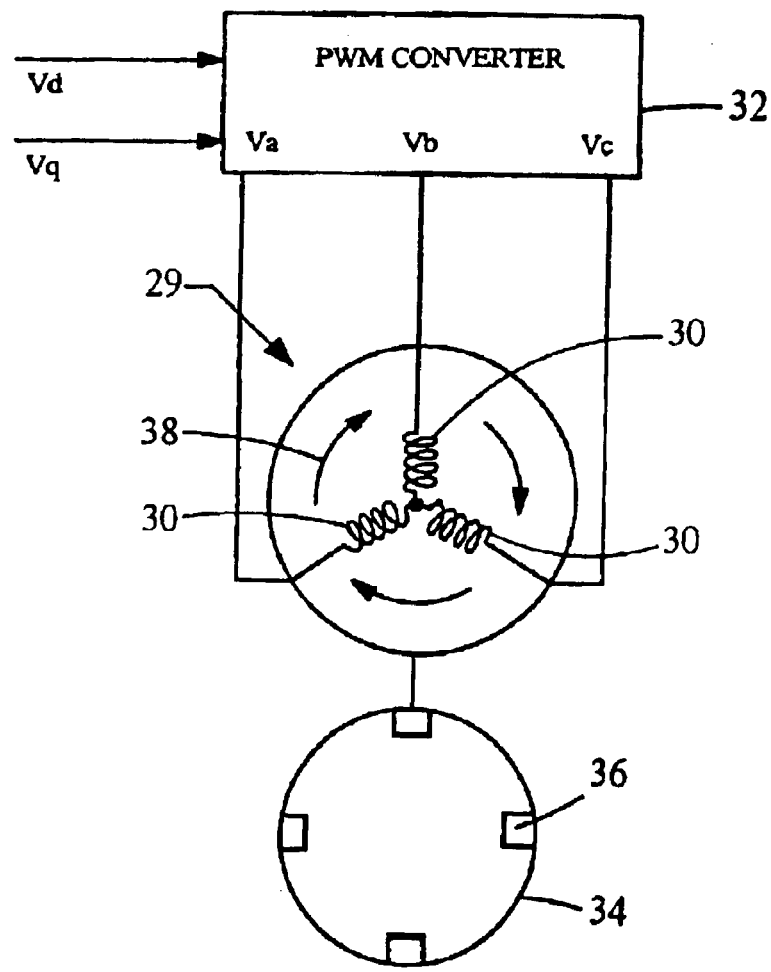
FIG. 2 is a schematic diagram of a brushless electric motor for use in the system of FIG. 1.
Figure 2:
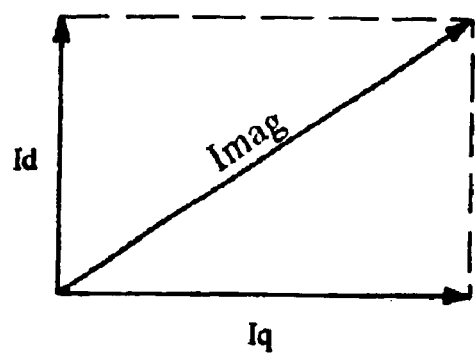

In a preferred embodiment, motor 24 is 3-phase brushless electric motor depicted schematically in FIG. 2. The motor includes a stator 29 that includes interconnected electrical coils 30 and generates an electromagnetic field in response to electrical current through the coils. Coils 30 are connected to a pulse width modulation inverter 32. Inverter 32 regulates the voltages Va, Vb and Vc to each coil and thereby adjacent electrical current to the coils. The brushless motor further comprises a rotor 34 that is arranged within the electromagnetic field and includes permanent magnets 36. By suitably modulating the voltages to the electrical coils, the electromagnetic field is rotated, for example, as indicated by arrows 38, thereby causing rotor 34 to rotate in response. It is pointed out that rotor 34, and thus the electromagnetic field, may rotate in either clockwise or counter clockwise direction to accommodate displacement of rack 20 in either direction as necessary to implement left or right turns.

The electrical current through the coils to generate the electromagnetic field is characterized by a direct current axis component, Id, and a quadradure current axis component, Iq, in perpendicular relationship. For the preferred brushless motor, the torque provided by the motor for steering assist is proportional to the magnitude of the Iq through the motor. The vector sum of Iq and Id determines the magnitude of the total current, referred to as Imag. In general, motor resistive losses are proportional to Imag, and motor efficiency is maximized when Imag equals Iq, that is, when Id is 0.

Figure 3:
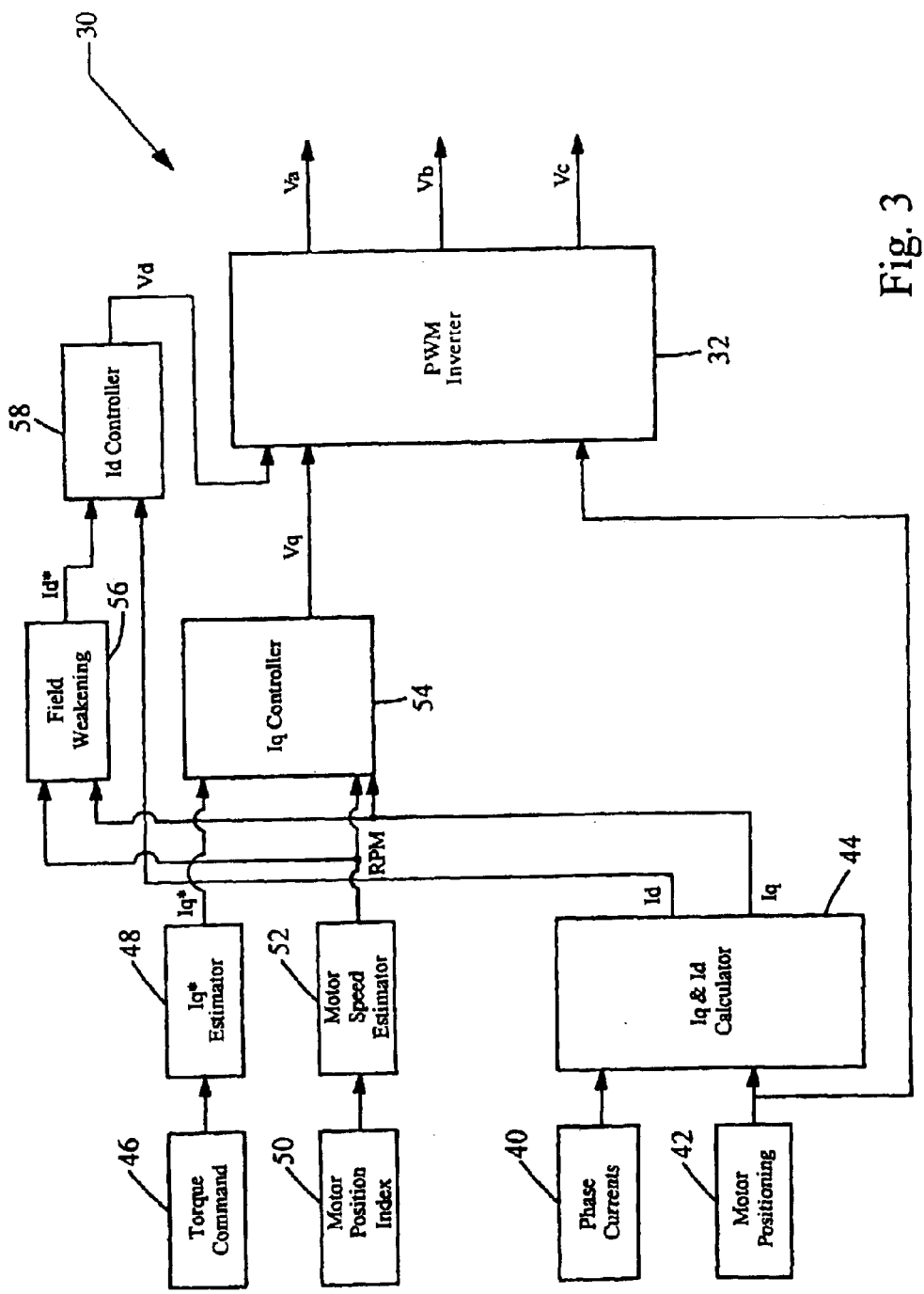
FIG. 3 is a diagram showing a space vector modulation control module for operating the brushless electric motor in FIG. 2 in accordance with this invention.

Control module 30 for EPAS system 10 comprises one or more microprocessors that carry out computer programs for calculating the voltages Va, Vb and Vc across the interconnected electrical coils, also referred to as phases, based upon space vector modulation. FIG. 3 is schematic diagram showing a preferred control process for the motor. Sensors within the motor provide electrical signals corresponding to phase currents 40 through the stator phases, i.e., electrical coils 30, and the motor position 42 of the rotor to an Iq and Id calculator 44 that calculates the actual Iq and the actual Id at which the motor is operating. A steering command by the operator results in a torque command 46 from torque sensor 22 that is input into a desired Iq* estimator 48 that estimates a desired Iq* to provide a desired steering assist. For purposes of the drawings and this description, the desired Iq and the desired Id are designated with an asterisk to allow them to be readily distinguished from the actual Iq and the actual Id. Sensors also provide a signal 50 corresponding to a motor position index differential 50 to a motor speed estimator 52 that determines motor speed, designated RPM. The actual Iq, the desired Iq*, and the motor speed is inputted into an Iq controller 54 that calculates a quadrature voltage, Vq, that is output to pulse width modulation (PWM) inverter 32, which calculates and applies Va, Vb, Vc to the stator coils.

Figure 4:
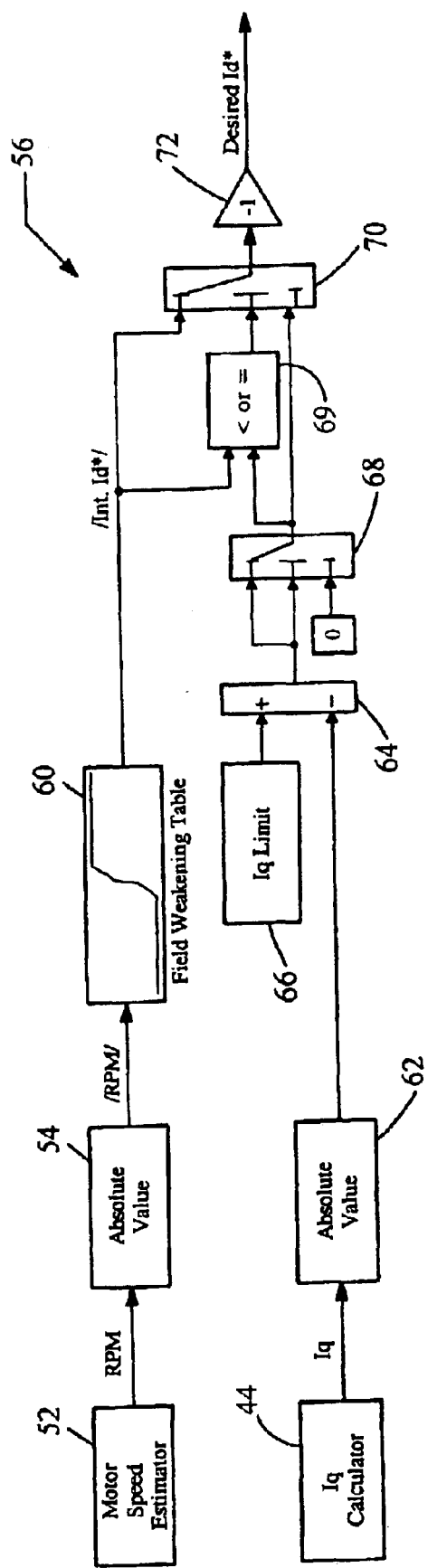
FIG. 4 is a schematic diagram showing details of a field weakening unit for the control module n FIG. 3.

In accordance with this invention, the control module also includes a field weakening module 56 that determines a desired Id* based upon the actual Iq and the motor speed RPM and outputs that to an Id controller 58. Referring now to FIG. 4 field weakening module 56 is depicted in greater detail. Motor speed from motor speed estimator 52 is input to block 54 that provides an absolute value motor speed. A desired Id* calculator 60 comprises a lookup table having absolute values for an initial desired Id*, designated Int Id*. For an absolute value motor speeds less than or equal to the maximum design motor speed for the motor, Int Id* is 0. For an absolute value motor speed greater than the maximum design motor speed, the value of the initial desired Id* is proportional to the difference between the absolute value motor speed and the maximum design motor speed. Field weakening module 56 also receives, as input from Iq calculator 44, the actual Iq. The unit determines the absolute value of the actual Iq at block 62 and compares that at block 64 to a predetermined Imag limit stored in memory 66, which Imag limit is based upon the design specifications for brushless electric motor 24. At decision block 68, where the Imag limit is greater than absolute value actual Iq, the decision block selects the difference between the Imag limit and the absolute value Iq. However, when the absolute value of the actual Iq is greater than the Imag limit, corresponding to a negative calculation at block 64, decision block 68 determines a 0. The output from decision block 68 is inputted to decision block 70 along with the absolute value of the initial desired Id*. Block 70 selects the lesser of the absolute value of the initial Id* as determined by block 60 and the output of decision block 68. Block 72 assigns a negative value to the output from block 70. The output of block 72 is the desired Id* and is input to the Id controller 58 in FIG. 3.

For a motor speed RPM less than or equal to the maximum motor speed for the motor, field weakening table provides an initial desired Id* that is 0, and the decision block 70 outputs a desired Id* that is 0. When the motor speed exceeds the maximum design motor speed for the motor, look-up table 60 provides an initial desired Id* that is nonzero. This is compared to the available Id, as determined by the Iq and the Imag limit. When the actual Iq is less than the Imag limit for the motor, indicating that the motor torque does not exceed the available torque from the motor, decision block 70 selects the lesser of the initial desired Id* and the difference between the available Id as the value for the desired Id*. The value is assigned a negative sign at 72. In subsequent calculations, the negative desired Id* results in a field that reduced, thereby reducing the field resistance to the rotation of the rotor and allowing the rotor speed to be increased.

Referring again to FIG. 3, the desired Id* from field weakening block 56 is input to an Id controller that calculates a direct current component voltage Vd and provides same to the PWM converter. The PWM inverter then calculates the voltages Va, Vb and Vc to the phases of the stator based upon the motor position signal 42, Vq from Iq controller 54 and Vd from Id controller 58.

Therefore, when the motor speed RPM is less than or equal to the maximum design motor speed, the desired Id* determined by the field weakening module 56 is 0. Under these conditions, the phase voltages Va, Vb and Vc are determined by the quadrature voltage Vq from Iq controller 54. This results in maximum efficiency in the operation of motor 24. However, when a steering command requires a motor speed greater than the maximum design motor speed, the field weakening effect block 56 provides a negative desired Id*. The PWM converter adjusts the phase voltages based upon the Vd from the Id controller 58. This has the effect of retarding the electromagnetic field relative to the field calculated for a 0 Id, thereby permitting the rotor to increase speed. It is pointed out that the motor operates at the increased speed with reduced efficiency due to the nonzero Id. Moreover, the field weakening provides a desired Id* that is the lesser of the value determined solely in response to the steering command and the available Id determined by the available torque for the motor. Thus, in driving conditions when a steering command requires a motor speed greater than the maximum design motor speed, the field weakening module determines the maximum value for the desired Id* without exceeding the torque limits of the motor. As a result, the field weakening module 56 provides an optimum response by the control module to a rapid steer command from the operator.

While this invention has been described in terms of certain embodiments thereof, it is not intended to be so limited, but rather only to the extent set forth in the claims that follow.

What is claimed:

1. An electric power steering assist system for an automotive vehicle comprising vehicle wheels and a steering column rotatable by an operator to turn said vehicle wheels, said system comprising:

a brushless electric motor comprising a stator for generating an electromagnetic field and a rotor disposed within said electromagnetic field and operatively coupled to said vehicle wheels, said rotor being rotatable at a motor speed and having a maximum design motor speed; and space vector modulation control module for determining electric current to said stator to rotate said electromagnetic field and thereby rotate the rotor, said space vector modulation control module comprising means for determining a desired quadrature axis current component responsive to rotation of said steering column, and means for determining a desired direct axis current component based upon motor speed such that said desired direct axis current component is zero when said motor speed is less than or equal to the maximum design motor speed and said desired direct axis current component is negative when said motor speed exceeds said maximum design motor speed.

2. An electric power steering assist system in accordance with claim 1 wherein, when said desired direct axis current component is determined to be negative, said space vector modulation control module determines the electric current to said stator effective to produce a field weakening effect within said brushless electric motor and to rotate said rotor at a motor speed greater than said maximum design motor speed.

3. An electric power steering assist system in accordance with claim 1 wherein said stator comprises a plurality of electrical coils and wherein said space vector modulation control module comprises a pulse width modulation inverter that regulates voltages to said electrical coils to establish the electric current.

4. An electric power steering assist system in accordance with claim 1 wherein said means for determining the desired direct axis current component comprises a lockup table.

5. An electric power steering assist system in accordance with claim 1 wherein said space vector modulation control module comprises at least one microprocessor.

6. A method for operating an electric power steering assist system of an automotive vehicle, said electric power steering assist system comprising a brushless electric motor Including a stator comprising electrical coils effective to generate an electromagnetic field in response to electric current applied thereto and a rotor disposed within said electromagnetic field and operatively coupled to wheels of said automotive vehicle; whereby the electric current to said electric coil is characterized by a direct axis current component and a quadrature axis current component, said method comprising:

detecting a steering wheel torque applied to a steering column by an operator;

determining a desired quadrature axis current component;

measuring a motor speed;

determining a desired direct axis current component based upon a motor speed, whereby the desired direct axis current component is zero when the motor speed is less than or equal to a maximum design motor speed and is negative when the motor speed exceeds the maximum design motor speed; and determining electric current to said coils based upon the desired quadrature axis' current component and the desired direct axis current component.

7. A method in accordance with claim 6 wherein the step of determining electric current comprises determining an electric current effective to produce a field weakening effect within said brushless electric motor when said direct axis current component is negative and to rotate said rotor at a motor speed greater than the maximum design motor speed.

8. A method in accordance with claim 6 further comprising determining voltages applied to the electric coils effective to achieve the electric current.

9. A method in accordance with claim 6 wherein the step of determining the direct axis current component comprises using a lookup table.

10. An electric power steering assist system for an automotive vehicle comprising vehicle wheels and a steering column rotatable by an operator to turn said vehicle wheels, said system comprising:

a brushless electric motor comprising a stator for generating an electromagnetic field and a rotor disposed within said electromagnetic field and operatively coupled to said vehicle wheels, said rotor being rotatable at a motor speed and having a maximum design motor speed;

space vector modulation control module for determining electric current to said stator to rotate said electromagnetic field and thereby rotate the rotor, said space vector modulation control module comprising means for determining a desired quadrature axis current component responsive to rotation of said steering column, means for determining an actual quadrature axis current component for said motor and determines the desired direct axis current component of zero when said actual quadrature axis current component exceeds a predetermined limit and means for determining a desired direct axis current component based upon motor speed such that said desired direct axis current component is zero when said motor speed is less than or equal to the maximum design motor speed and said desired direct axis current component is negative when said motor speed exceeds said maximum design motor speed.

11. A method for operating an electric power steering assist system of an automotive vehicle, said electric power steering assist system comprising a brushless electric motor including a stator comprising electrical coils effective to generate an electromagnetic field in response to electric current applied thereto and a rotor disposed within said electromagnetic field and operatively coupled to wheels of said automotive vehicle; whereby the electric current to said electric coil is characterized by a direct axis current component and a quadrature axis current component, said method comprising:

detecting a steering wheel torque applied to a steering column by an operator;

determining a desired quadrature axis current component;

measuring a motor speed;

determining a desired direct axis current component based upon a motor speed, whereby the desired direct axis current component is zero when the motor speed is less than or equal to a maximum design motor speed and is negative when the motor speed exceeds the maximum design motor speed;

determining an actual quadrature axis current component for said motor and determining the desired direct axis current component of zero when said actual quadrature axis current component exceeds a predetermined limit; and determining electric current to said coils based upon the desired quadrature axis' current component and the desired direct axis current component.

* * * * *

UNITED STATES PATENT AND TRADEMARK OFFICE
CERTIFICATE OF CORRECTION

PATENT NO.     : 6,864,662 B2                                                   Page 1 of 1
DATED          : March 8, 2005
INVENTOR(S)    : Darrel Alan Recker It is certified that error appears in the above-identified patent and that said Letters Patent is hereby corrected as shown below:

<u>Column 6,</u>
Line 2, before "a stator" delete "Including" and substitute -- including -- in its place.

Signed and Sealed this

Eleventh Day of October, 2005

JON W. DUDAS
*Director of the United States Patent and Trademark Office*